United States Patent [19]

Kallos

[11] Patent Number: 4,684,855

[45] Date of Patent: Aug. 4, 1987

[54] PERMANENT MAGNET DIRECT CURRENT MOTOR APPARATUS

[76] Inventor: Joseph Kallos, 195 Eaton St., Bridgeport, Conn. 06600

[21] Appl. No.: 785,265

[22] Filed: Oct. 7, 1985

Related U.S. Application Data

[63] Continuation-in-part of Ser. No. 588,352, Mar. 12, 1984, abandoned.

[51] Int. Cl.$^4$ .............................................. H02K 23/00
[52] U.S. Cl. .................................... 318/254; 318/138
[58] Field of Search ............... 318/696, 685, 138, 254; 310/156

[56] References Cited

U.S. PATENT DOCUMENTS

| | | | |
|---|---|---|---|
| 2,907,903 | 10/1959 | Reijnst et al. | 310/156 |
| 3,909,691 | 9/1975 | Wilson et al. | 200/24 X |
| 4,004,207 | 1/1977 | Dickson | 200/11 R X |
| 4,105,865 | 8/1978 | Guillory | 200/23 X |
| 4,417,186 | 11/1983 | Hirose et al. | 318/254 |
| 4,454,438 | 6/1984 | Yamashita | 310/162 |

*Primary Examiner*—William M. Shoop, Jr.
*Assistant Examiner*—Saul M. Bergmann
*Attorney, Agent, or Firm*—Joseph R. Carvalko, Jr.

[57] ABSTRACT

Disclosed is a permanent magnetic direct current motor apparatus which provides high constant torque and constant speed through a large stepping angle under varying output shaft load conditions. The apparatus includes a rotor, a plurality of stators and an electronic control device for providing a constant torque and speed. The rotor is constructed of a cylindrical homogeneous core having an outer, segmented ring formed from a plurality of permanent magnets. The magnets are of alternating polarity and are divided into groups. There is a stator apparatus surrounding the rotor which is composed of cylindrically spaced rows of electrically conductive coils radially spaced apart. A timing disk concentric with and rotating with the rotor senses the speed of the rotor and feeds back periodic timing pulses to an electronic switching system to control the current through the stators. The stators are electromagnetically coupled to the permanent magnet rotor surface. The current through the stators thereby control the magnitude of the electromagnetic flux and causes the rotor to maintain a constant speed as output shaft loads vary.

7 Claims, 12 Drawing Figures

ONE INDIVIDUAL MAGNET

PERMANENT MAGNET DIRECT CURRENT MOTOR APPARATUS

RELATED APPLICATIONS

This is a continuation-in-part of Ser. No. 588,352, filed Mar. 12, 1984, now abandoned for a Permanent Magnet Stepping Motor Apparatus.

BACKGROUND OF THE INVENTION

FIELD OF THE INVENTION

The present invention is directed to a permanent magnet direct current (d.c.) motor apparatus. Direct current motors as such are characterized by their simplicity of design and ability to convert electrical energy into mechanical rotary motion. They are normally used in engineering applications where continuous angular output shaft rotary motion is necessary. The output shaft rotates or moves through a specific angle as a result of an incoming electric pulse or exitation. The principle features of a conventional d.c. motor are a field winding, an armature winding and a commutator. The theory and operation of such motors is well known in the art of electromechanical energy conversion and need not be further explained here. The stators upon which the field windings are located generally consist of unlaminated ferromagnetic material. The flow of d.c. through the field windings establishes a magnetic field distribution along the periphery of an air gap maintained between the stators and the armature. The rotor upon which the armature winding is located is generally a laminated core. The rotor also contains the commutator which is basically a mechanical rectifier to serve the function of converting the induced alternating current voltage into a direct current voltage.

Another type of motor related to the present invention is the d.c. stepper motor. Stepper motors are generally used when incremental angular shaft rotary motion rather than continuous angular shaft rotary motion is needed. The principle features of a d.c. stepper motor are a field winding, an armature and a means for supplying an external pulse train to the field winding. The incremental angular shaft rotary motion is characterized by detent positions. Stepping angles may vary from 5 to 90 degrees, and the stepping rates may vary from about 100 steps per second for larger units to 350 steps per second for small motors. Generally, the rotor of a stepper motor has the ability to quickly stop after a given angle is traversed. The commonly available permanent magnet (pm) stepper motor has a wire wound stator with a pm rotor which delivers low torque. The direct current stepper motors are generally divided into three types, namely permanent magnet, variable reluctance, and permanent magnet-hybrid. The variable reluctance stepper motor is typically the most economical multipole soft iron rotor. The variable reluctance stepper is suited for low inertial loads, and small incremental angular movement.

The permanent magnet hybrid stepper motor is formed from a combination of the variable reluctance and permanent magnet stepper motors and is capable of the higher torque capacities at relatively small incremental angles ranging up to 15 degrees. Up to this time, and allowing for relatively high cost, the pm hybrid stepper motor has provided good performance in the appropriate applications.

As mentioned, the present application deals with a permanent magnet d.c. motor apparatus having a high torque capability and the ability to provide incremental angular motion ranging up to as much as 180 degrees, but preferably in the 45 degree to 90 degree range. The present disclosure describes a permanent magnet motor and apparatus which has the ability to provide constant high torque. Because of the inertia provided by the rotor the output shaft mechanically integrates any apparently incremental motion of the rotor and produces an effectual continuous output shaft rotation. The present disclosure describes a permanent magnet motor and apparatus which has the ability to provide constant high torque while employing a wound stator and a permanent magnet type rotor. Unlike the aforementioned pm stepper motors the pm d.c. motor described herein is used in applications where high output shaft power is a primary concern and not the control of discrete movement of the output shaft through a given angle. This is accomplished by the use of a novel arrangement of permanent magnets on the rotor of the d.c. motor which generate localized flux to act in association with solenoid style coils in the stator which are induced with a predetermined sequential flow of current from an electronic control device. The electronic control device provides electric current in response to a substantially high torque demand upon the rotor. In addition, the electronic control device provides a constant torque and speed relationship. Once the rotor is placed in motion its shaft output speed and torque is smooth and continuous and does not resemble the discrete motion that conventional pm stepper motors exhibit.

SUMMARY OF THE INVENTION

The present invention is directed to a permanent magnet d.c. motor apparatus which is intended to provide high constant torque and speed through a substantially large angle. The constant torque and speed is maintained throughout the rotation angle by virtue of an electronic control device, which constitutes a feed back control system.

More broadly, the present invention relates to a permanent magnet d.c. motor apparatus having a rotor with a homogenous core which surrounds a longitudinal axis of the rotor. There is an outer, segmented ring mounted upon an homogenous core, which is formed of a plurality of alternating polarized groups of magnets. Any first group of magnets of the polarized groups of magnets has an end magnet juxtaposed to an end magnet of a second group of magnets for providing a plurality of spatially distributed, localized magnetic flux about the outer circumference of the outer segmented ring. There is a stator surrounding the rotor, which has a plurality of cylindrically spaced rows of elongate electrically conductive coils, radially disposed outside of the rotor. The coils are connected by electromagnetic coupling to the spatially distributed, localized magnetic flux about the outer circumference of the outer segmented ring. There is a timing apparatus which provides a periodic timing pulse in response to rotation of the rotor and there is an electronic control device which is responsive to the periodic timing pulse for providing a sequential flow of current to the conductive coils proportional to the speed and rotation of the rotor. The electromagnetic flux produced by the conductive coils is a function of the current flowing through the conductive coils and is therefore directly proportional to the generation of periodic timing pulses over one revolution of the rotor. To start the rotor in motion there is as a component of the timing means a mechanical linkage or electromechanical device that the operator or user of the motor employs to physically position the rotor and its associated timing apparatus.

The electronic control device includes a switching module device for sequentially conducting direct current to the electrically conductive coils in response to a periodic timing pulse. And there is a connection between the switching module device to the plurality of electrically conductive coils. Throughout the text the word stator will broadly refer to a device that generates an electromagnetic field. The phrase electrically conductive coils will specifically refer to a component of the stator.

With the foregoing in mind, it is a primary object of the present invention to provide a permanent magnet d.c. motor apparatus for maintaining a high constant torque and speed during operation.

It is another object of the present invention to provide smooth and continuous output shaft rotation using a permanent magnet rotor and providing current to the stator.

It is yet another object of the present invention to provide a means of constructing a rotor for holding polarized groups of magnets which produce a plurality of spatially distributed, localized magnetic flux about the rotor.

DESCRIPTION OF THE PREFERRED EMBODIMENT

Figure 1:
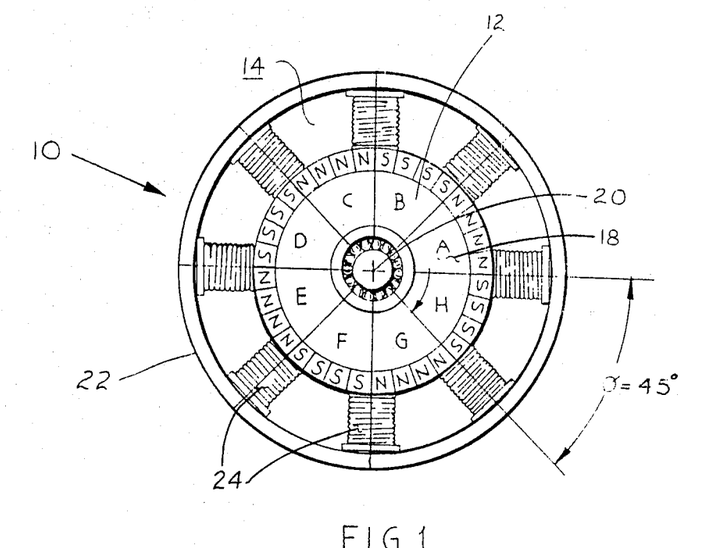
FIG. 1 represents an end view of the electrical motor illustrating the preferred embodiment of the present invention.

The present invention relates to a permanent magnet d.c. motor apparatus which includes an electronic control device. Referring to FIG. 1, there is shown an end view of an electrical pm d.c. motor 10. It is pointed out that the present specification and explanation of the construction and operations of the permanent magnet d.c. motor 10 as such is detailed to describe a specific pm motor design, however, it is felt that the advantages and benefits derived from the present description will be helpful in the design and construction of other types of motors as well.

Referring back to FIG. 1 it is noted that the mechanical housing and mounting apparatus of the present pm d.c. motor 10 are not shown in the accompanying drawings in order that a clear picture of the important internal features of the pm d.c. motor 10 be presented. Therefore, it will be recognized that appropriate structure and accommodating hardware will be added as required to accomplish the end result of a complete operational and installable motor. The motor 10 as such has a rotor 12, and a stator 14, each respectively having specific structure and interrelating operation and control as provided from an electronic control device represented in FIG. 4.

Figure 2:
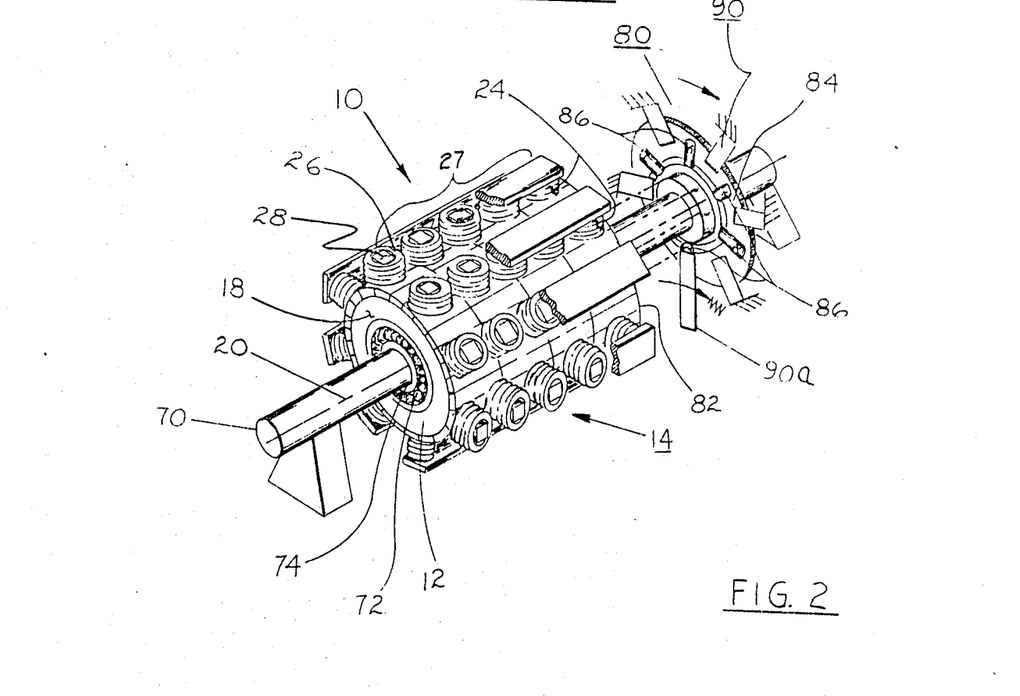
FIG. 2 represents an isometric view of the electrical motor as taken from FIG. 1 to illustrate the preferred embodiment and construction of the stator windings.

In FIGS. 1 and 2 we see an end view and an isometric view of the pm motor 10. The rotor 12 is composed of an homogeneous core 18 which in the preferred embodiment surrounds a longitudinal axis 20 representing the geometric center of the entire pm motor 10. The stator 14 is composed of a fixed structure 22 which is appropriately mechanically attached to supports, and structure securing the pm motor 10 to the applied mounting as previously mentioned. There is a plurality of electrically conductive coils 24 mounted within the fixed structure 22. The electrically conductive coils 24 are arranged in the present preferred embodiment at a spaced apart angle of 45 degrees so that there is a total of eight spaced apart rows of the coils 24 radially disposed as such. An individual row 26 of the coils 24 (FIG. 2), is made of a plurality of coils 27, in the present case numbering five. It will be discussed below that each of these five coils are connected electrically in series. Each row may be connected in series or in parallel with every other row as will be explained below.

The coils 24 are each constructed of a suitable electrically conductive wire such as copper which is wound about an insulator such as air or a ferromagnetic material 28. This construction is similar in nature to that of a simple solenoid device, and may be applied in different forms as will be described in an alternate embodiment to be discussed later in the present specification. At this time, in the interests of simplifying discussion, the electrically conductive coils 24 will be referred to as solenoid devices 24, each having the same meaning and purpose. It will be noted that there are five solenoid devices 24 arranged in an individual row 26 of solenoid devices such as the individual row 26, however, there could be more, or less depending on the amount of torque and speed desired and the size requirements of the pm motor 10.

Figure 3:
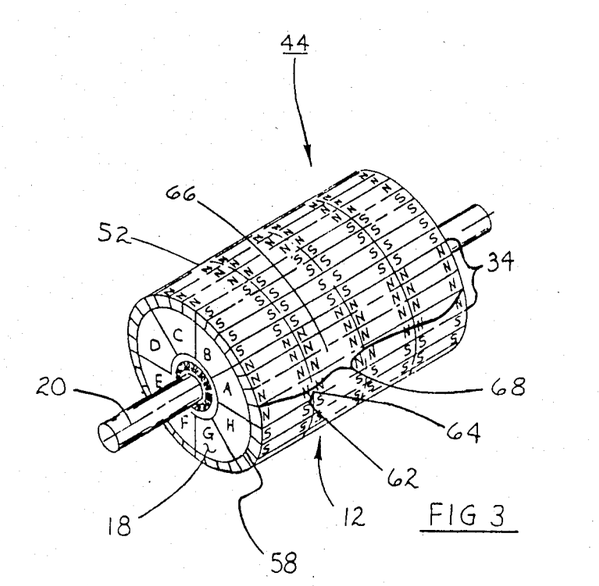
FIG. 3 represents an enlarged isometric view of the rotor construction of the present invention as taken from FIG. 2 with the stator windings removed for clarity.
Figures 3A, 3B:
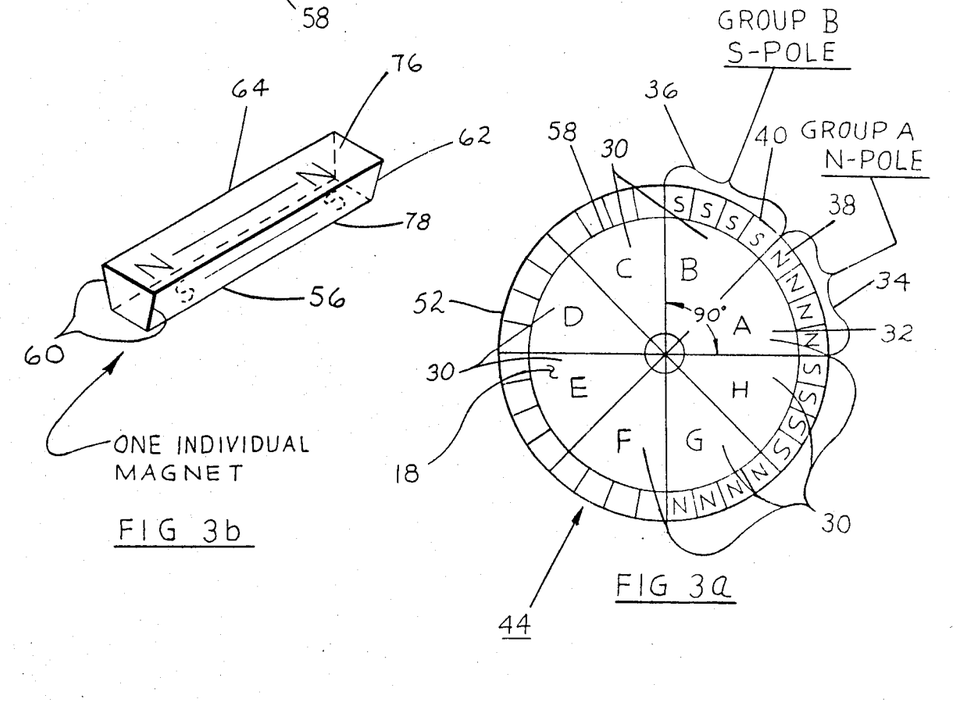
FIG. 3a represents an end view of the rotor as taken from FIG. 1 to illustrate the groups of magnets which form the segmented ring.
FIG. 3b represents an enlarged isometric view of an individual magnet as taken from FIG. 3.

Referring to FIGS. 3 and 3a, the construction of the rotor 12 is best seen where the rotor 12 has been removed from the stator 14 for clarity. The homogeneous core 18 which makes up the supportive body of the rotor 12 is manufactured of a suitable dielectric material such as fiberglass. It will be noted that fiberglass being a lightweight material vastly improves the weight to horsepower ratio in the present invention when compared to other motors with similar horsepower characteristics. For the purposes of explanation, the body of the rotor 12 has been radially divided into an eight section arrangement 30 where each section such as a section 32 is designated with an identifying letter such as "A". Accordingly, there is a "B" section and so forth, and each section is also representative of an unlike and like pole condition as determined by a group of magnets 34 which are the "A" group, or "A" section and so forth. The group of magnets 34 represents a like group of magnets of North polarity, while a group 36 represents an unlike group of magnets of South polarity.

Therefore, with this arrangement of groups of magnets such as 34 and 36, there is an end magnet 38 in juxtaposition to an end magnet 40, the end magnet 38 being one of the plurality of magnets 34 in the like group of magnets. This arrangement of groups of magnets creates a segmented ring 44 composed of the repeating alternate groups of like and unlike groups of magnets which total eight groups. The present arrangement has four magnets within each separate group of magnets such as 34 and 36, and there is a total of sixteen magnets in each group, such as the group 34 of sixteen magnets, each magnet being a like, (North) polarity. There is, therefore a total of one hundred and twenty eight magnets, where one half are like (North) and the other half are unlike (South) polarity, for the purposes to be defined later in the present specification. Again, it is pointed out that it is entirely possible to have a different total number of magnets to achieve the effect and purpose of the present invention, and accordingly it is noted that the sections which are representative of the division of magnet groups upon the homogeneous core 18 may be more or less depending upon the desired design of the pm motor 10. The eight section arrangement 30 disclosed and described heretofore is intended to complement the best working stepping angle which has been found to be 45 degrees. However, it is fully possible to have the pm motor 10 accommodate a 90 degree angle, and even a 180 degree angle which would benefit from consideration for another arrangement of groups of magnets to accomplish the desired rotation of the rotor 12.

Figure 6:
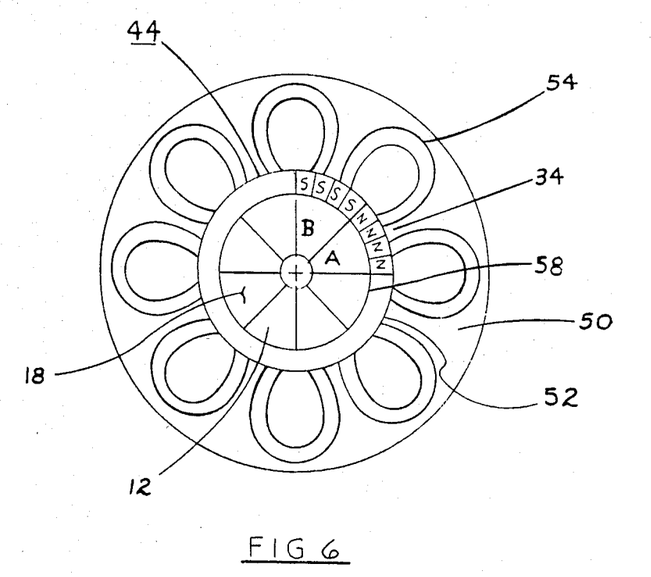
FIG. 6 represents an end view of the permanent magnet d.c. motor taken along the lines of FIG. 1 to illustrate the spatially distributed localized magnetic flux generated by the group of magnets about the segmented ring of the rotor.
Figure 7:
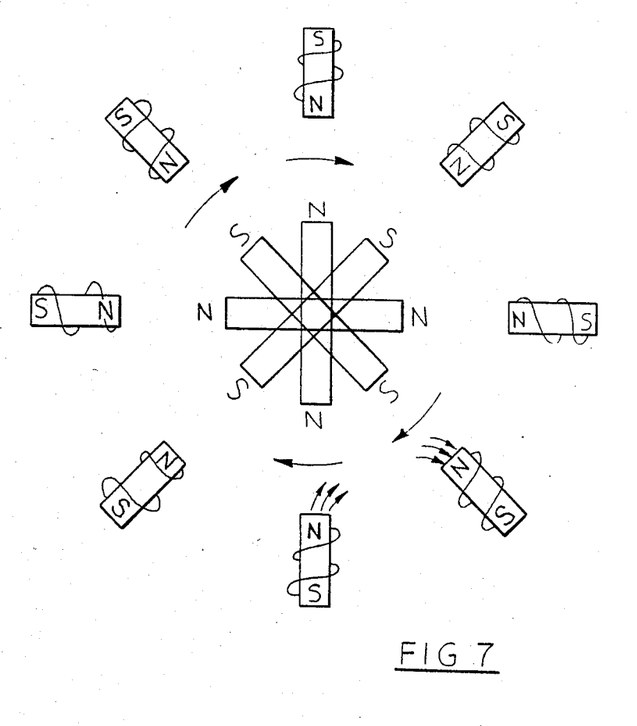
FIG. 7 represents a schematic view of the permanent magnet d.c. motor to illustrate the basic operation of the motor.

Referring to FIG. 6, it will be seen that there is a spatially distributed, localized magnetic flux 50 surrounding an outer circumference 52 of the rotor 12, and the outer segmented ring 44. An individual magnetic flux 54 is seen between the sections A and B, and is repeated eight times between the like and unlike poles of the groups of magnets such as the group 34 and 36. Referring to FIG. 3b, there is shown a single magnet 56, as it is removed from an outer surface 58 of the homogeneous core 18. At this time, it is mentioned that it is necessary to use a good permanent bonding method to secure the magnets such as the magnet 56 to the outer surface 58 of the homogeneous core 18. And, as seen in FIG. 3b, the magnet 56 has a symetrical trapezoidal shape 60, for side by side alignment with the remainder of magnets mounted upon the outer surface 58 of the homogeneous core 18. Each magnet is aligned, with an end 62, juxtaposed to an end 64 of an adjoining magnet 66 to form a line of magnets 68, which as mentioned previously total four so that there are sixteen similar magnets in the group of magnets 34 and so forth.

Referring once again to FIG. 2, there is shown a shaft 70 which is fixed against rotation, and mounted to receive a ball bearing 72, which is suitably pressed into an end 74 of the homogeneous core 18, (at both ends), in order to support the rotor 12 for rotation. While this arrangement is convenient, there is an optional arrangement (not shown) for rotatably supporting the rotor 12 by having the shaft 70 formed from the material of the homogeneous core 18, and by having the ball bearing 72 mounted to suitable structure attached to the fixed structure 22, in turn holding the stator 14. It will be noted in reference to FIG. 3, that the magnets previously defined in their trapezoidal shape, have parallel sides which alternately face the stator 14 on outside surface 76 (referring to the single magnet 56), and on inside surface 78, for attachment to the outer surface 58, of the homogeneous core 18. Therefore, the outside surface 58 of the core 18 as such is preferably multisurfaced in flat areas in the present case for receiving thirty two circumferentially arranged separate magnets of the shape mentioned heretofore; thus, making the task of bonding the subject magnets to the core 18 easier to accomplish.

Referring once again to FIG. 2, there is shown a timing device 80 for providing a periodic timing pulse which is suitably attached to a rear side 82 of the rotor 12 for rotation with the rotor 12. The timing device 80 is comprised of a plurality of electrical contacts 86 radially disposed about the rotor shaft 70 which cooperate to supply timing pulses to the electronic control device of the preferred embodiment. There is a fixed contact device 90a, which is secured to a suitably fixed structure (unshown). The fixed contact device 90a being arranged to engage a metallic clad that is electrically connected to the plurality of radially disposed contacts 86. A d.c. electrical potential is directed through the fixed contact device 90a to the contacts 86 as such during rotation of the rotor. The rotation of rotor causes a sequential interruption of a d.c. electrical potential among the contacts 86 which as will be shown to provide the means to sequentially control the d.c. current to the stators and regulate both the torque output and speed of the rotor 12. The necessary contact between the electrical contacts 86 on the surface of the rotor shaft 70 and the fixed contact 90a is achieved by a rotation of the rotor. The rotation of the rotor 12 is initiated by employing a mechanical linkage that the user of the motor 10 employs, or any other means such as a small motor and associated hardware linked to the rotor shaft (unshown).

It will be apparent to those skilled in applied electronics that a device known in the art as a digital optical encoder will also work in place of the timing device described herein if appropriate circuit modifications are made to interface with the input requirements of the Electronic Control Device of the preferred embodiment, to be discussed below. The inventor has determined that the best mode of the invention is achieved using the timing device described herein because it achieves a minimization of expense and complexity. Furthermore, the stators consume large amounts of pulsed current. The inductive response to this produces considerable electromagnetic interference within the proximity of the timing device. Low signal output devices such as optical encoders may be susceptible to these types of interferences. The timing device used herein provides a high signal to noise ratio and is therefore unaffected by the electromagnetic interference that the stators produce.

THE ELECTRONIC CONTROL DEVICE OF THE PREFERRED EMBODIMENT

Figure 4:
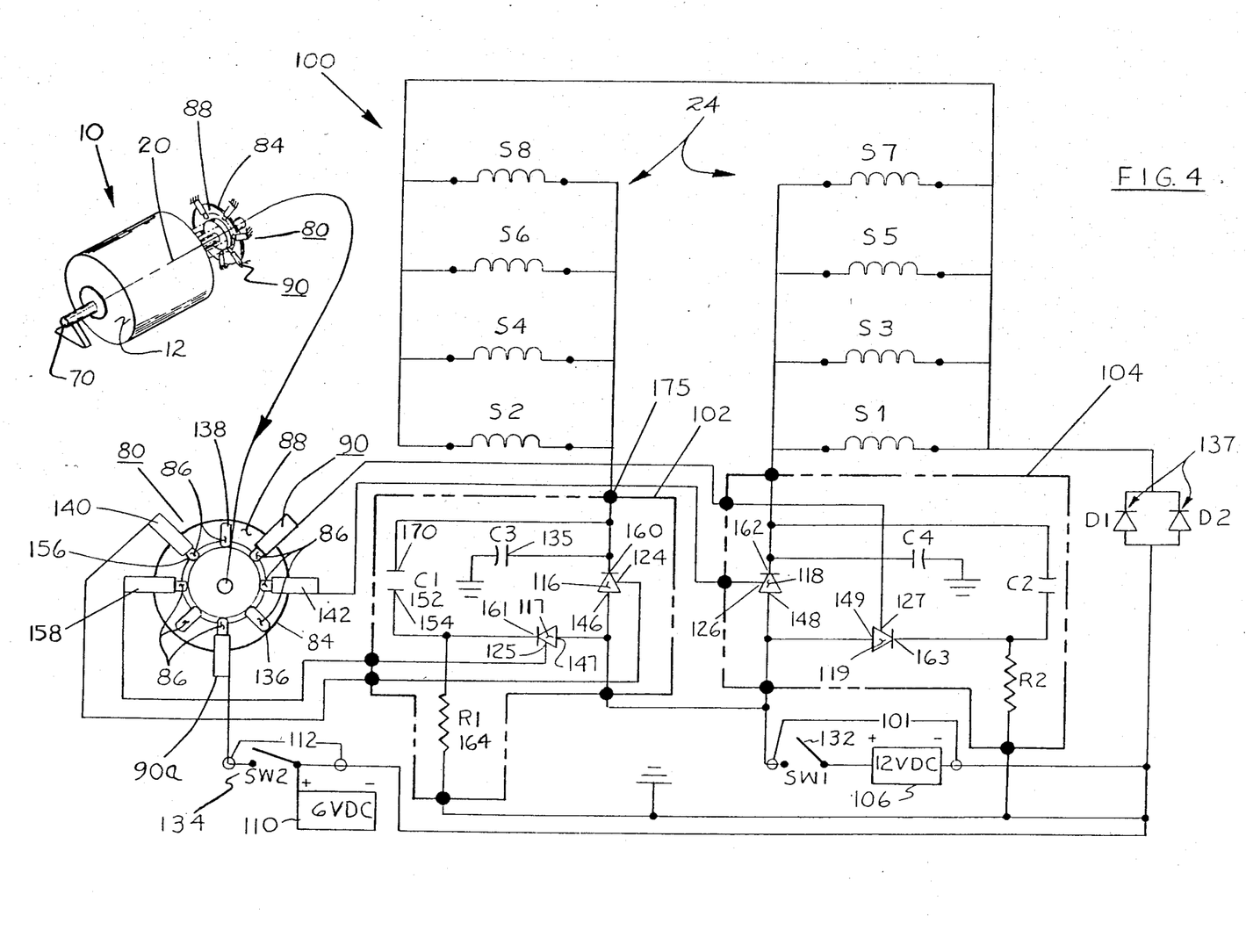
FIG. 4 represents an electrical schematic of the electronic control device of the present invention.
Figure 5:
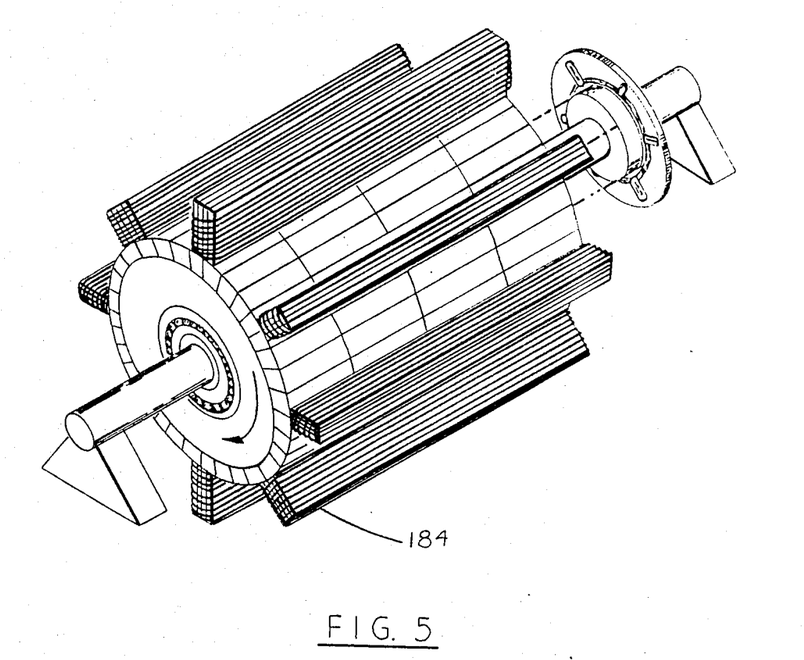
FIG. 5 represents an alternative embodiment of the permanent magnet d.c. motor taken along the lines of FIG. 2 to illustrate the stators.

An electronic control device 100 of the invention is illustrated in FIG. 4, with those portions of the circuit having any relationship with the structure illustrated in FIGS. 1-3 and FIGS. 5-7 bearing identical reference designations as used in those figures. Generally, the electronic control circuit 100 will be contained within an enclosure (unshown) mounted within the proximity of the pm d.c. motor 10 as illustrated in FIGS. 2 and 5.

Basically, the operation of the electronic control device 100 can be described in the following manner. The direct current (d.c.) entering the system is constant. The d.c. is switched between two sets of electrically conductive coils 24 during rotation of the rotor 12. In this manner intermittent discrete square wave current pulses flow to the electrically conductive coils. The switching of d.c. is accomplished by alternately turning on and turning off the silicon control rectifiers (SCRS) designated in FIG. 4 as items 116 and 118. The electrically conductive coils also designated as S2, S4, S6, and S8 in FIG. 4 are switched on by SCR 116 during alternate 45 degree rotation of the rotor 12. A conductive coil current conductor connects the conductive coils to an output terminal 175 on a switching module 102 in which the SCR 116 is contained. The electrically conductive coils also designated as S1, S3, S5 and S7 in FIG. 4 are switched on by SCR 118 during the subsequent 45 degree rotation of the rotor 12. The average d.c. flowing through each set of the electrically conductive coils in FIG. 4, of S2, S4, S6 and S8, or S1, S3, S5 and S7 depends on the length of time the SCRS 116 and 118 are on, respectively. The SCRS 116 and 118 are turned on and off by periodic timing pulses that are generated by the timing device 80 mounted to the rotor shaft 70. A periodic timing pulse is generated at the point the rotor 12 passes through an integral rotation of 45 degrees i.e., 0, 45, 90, 135, 180, 225, 270, 315 degrees.

Because the electromotive force produced by the electrically conductive coils 24 causes rotation of the rotor 12 of the motor 10, and the timing device 80 integrally sensing rotation on the rotor shaft 70, any differential change in the speed of the rotor 12, that may be caused by a load on the output side of the rotor 12, will cause a change in the time interval between periodic timing pulses.

The change in the time interval between periodic timing pulses causes the SCRS 116 or 118 to be switched on for a greater time period or lesser time period depending on whether the change in the time interval is more or less. Since the average d.c. flowing through the electrically conductive coils 24 depends on how long the SCR 116 or 118 is on, any increase in rotor speed will shorten the interval between periodic timing pulses and hence the time that SCR 116 or 118 is on reduces the average d.c. flowing through the electrically conductive coils 24 and thereby causes a slowdown of the rotor. The foregoing description explains the principle of feedback control which regulates the speed and torque generated by the motor 10.

The motor herein described is unlike conventional pm stepper motors in that the latter contain rotors that are small in diameter (less than six inches) and hence are very low in inertia. This allows the rotor to be discretely and incrementally moved through small angles ranging from 0 to 15 degrees. The rotor in the present invention is intended to be of a relatively large diameter of greater than six inches. The large inertia of this rotor does not lend itself to be incrementally stopped and started or precisely positioned in respect to angular rotation. The result is a continuous and smooth rotation of the rotor notwithstanding the fact that the action of the rotor motion is produced by intermittent current pulses to the stator.

The electronic control device 100 illustrated in FIG. 4 is responsive to the periodic timing pulses for providing a sequential flow of d.c. to the electrically conductive coils 24. The electronic control device includes two electronically identical switching modules 102 and 104. The switching modules 102 and 104 serve to provide d.c. current to the plurality of the electrically conductive coils 24 designated as S1 through S8 in FIG. 4. For purposes of explanation, switching module 102 provides d.c. current to the plurality of electrically conductive coils S2, S4, S6, and S8 as the rotor 12 rotates through angles 0 to 44 degrees, 90 to 134 degrees, 180 to 224 degrees and 270 to 314 degrees and switching module 102 provides d.c. current to the plurality of electrically conductive coils S1, S3, S5 and S7 as the rotor 12 rotates through angles of 45 to 89 degrees, 135 to 179 degrees, 225 to 269 degrees, and 315 to 379 degrees. The plurality of electrically conductive coils illustrated in FIGS. 2, 24 and 5, in an alternate embodiment 184, are both depicted electrically in FIG. 4 as S1 through S8. It will be apparent to those skilled in the art of applied electronics that the electronic control device 100 is unaffected in theory by the alternate embodiment of the electrically conductive coil configurations shown in FIGS. 2, 14, and in FIG. 5, 184. It will also be apparent that to those skilled in the art of applied electronics that an analysis of the switching module 102 and its associated electrically conductive coils 24, S2, S4, S6 and S8, and the timing device 80, will suffice to explain the switching module 104 and its associated electrically conductive coils 24, S1, S3, S5, and S7 as they relate to the timing device 80. The preferred embodiment discloses eight sets of radially disposed electrically conductive rows of coils, 24 as shown radially separated by 45 degrees FIG. 2 and is variously referred to as an eight pole motor. The invention contemplates that more or less than eight poles will work with commensurate gains and losses of horsepower efficiency. However, as is evident any increase or decrease in the number of poles must be made in multiples of four for the sake of electromagnetic symmetry. Regardless of the number of sets of four poles incorporated the electrical control device requires two switching modules.

The electronic control device 100 of FIG. 4 includes a basic voltage supply 106 provided across d.c. supply conductors 101 attached to two opposing end terminals to power the switching modules 102 and 104. The illustrative circuit voltage as shown in FIG. 4 is 12 volts direct current (d.c.), but the circuit can operate equally well with different supply voltages as long as the values of the various circuit components are adjusted accordingly.

The electronic control device 100 also includes a second direct current voltage supply 110 provided across a conductor 112 to transfer voltage through the fixed contact 90$a$ and the radially disposed electrical contacts 86 and ultimately the silicon control rectifier gates 124, 125, 126, 127 of a group of the silicon control rectifier's (SCRS) 116, 117, 118, and 119. The illustrative second direct current voltage supply 110 is 6 volts, but the circuit can operate equally well with a different voltage provided the SCRS actually used can accommodate a different gate voltage.

Figure 8:
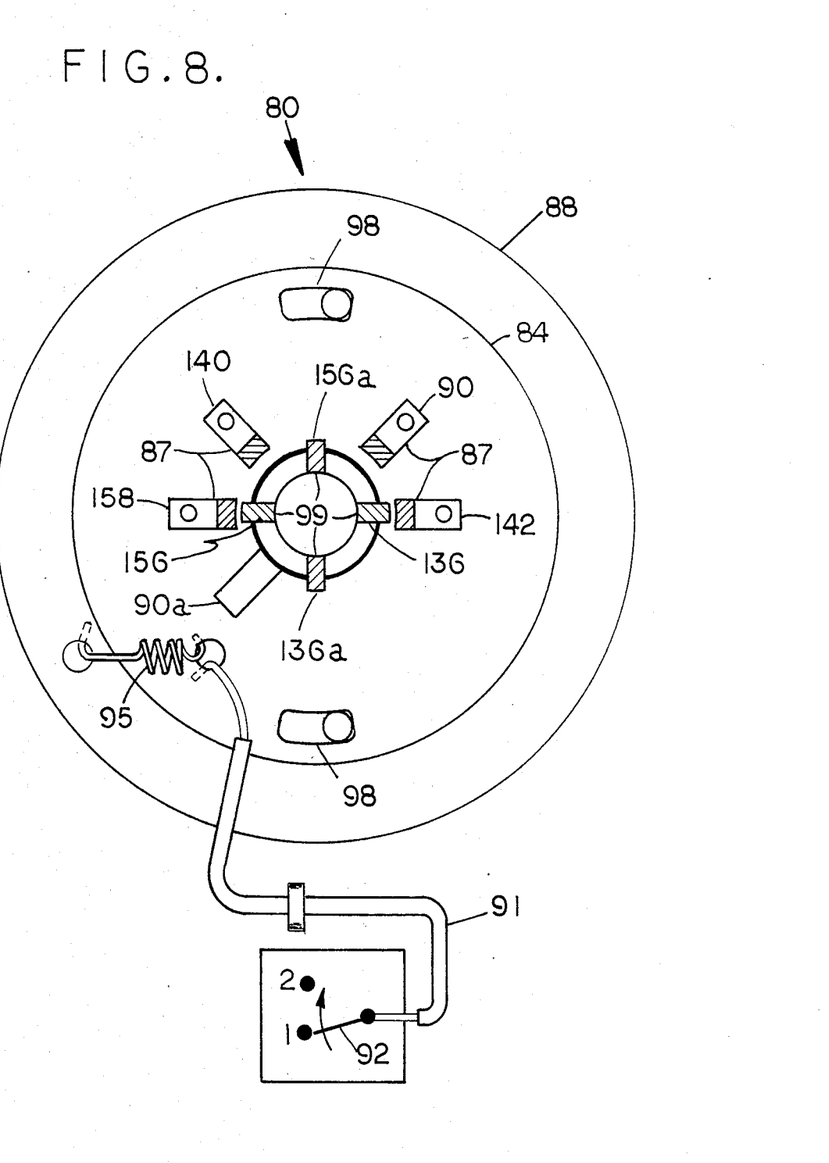
FIG. 8 represents a schematic view of the preferred embodiment of the timing mechanism.

Referring to FIG. 8 the preferred embodiment of the timing device shown resembles a d.c. motor commutator. To start the motor requires that a switch, FIG. 4, 134, (SW2), and a switch FIG. 4, 132, (SW1), be closed. Thereafter electrical contact must be established between one of the electrical contacts 90, 140, 142 or 158 and one of a set of rotary electrical contacts 99. This is accomplished by manually causing a rotation of the circular disk element 84 utilizing a wire hose 91 in combination with a spring 95. When a lever 92 is turned from a position 1 to a position 2 the wire hose pulls the disk 84 counterclockwise. The disk 84 is spring loaded by the spring 95 attached from the disk element 84 to a fixed disk 88. The rotation of disk 84 is limited by a stop pin and slot 98. The stop pin and slot 98 allows a sufficient rotary motion of disk 84 to cause one of its electrical contacts to contact one of the electrical contacts 99.

When electrical contact between the disk 84 contact 87 and the rotary contact 99 is made an electrical potential is established between fixed contact 90a and either SCR gate 124 or SCR gate 126 of FIG. 4 causing current conduction through the respective SCR. The conduction of current through either SCR then flows to the respective set of stators causing the rotor to turn.

Figure 9:
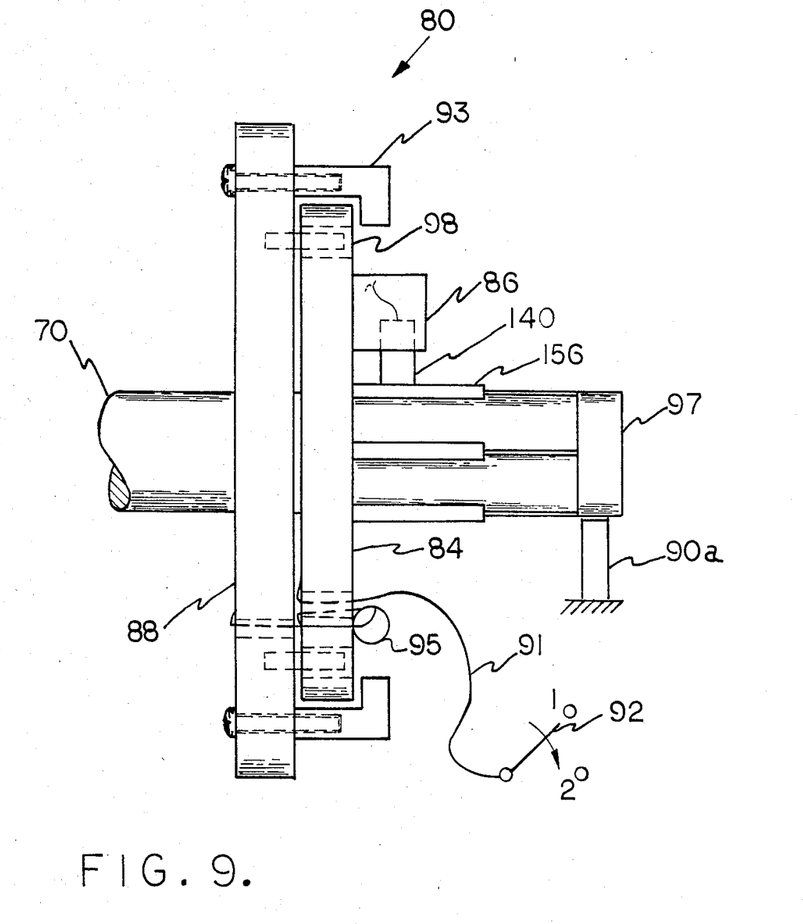
FIG. 9 represents a side view of the preferred embodiment of the timing mechanism.

FIG. 9 is a mechanical view of the timing device 80. A clamp 93 holds the disk 84 to the fixed disk 88. For illustration, one fixed electrical contact 140 is shown in contact with the rotary contact 156. The rotary contacts are electrically connected to a cylindrical copper clad 97 which is in intimate contact with the fixed contact 90a on which the 6 V timing voltage is impressed.

Referring to FIGS. 4 and 8, when the switch 132, (SW1) is closed the basic voltage supply current flows through a circuit connecting the positive side of the basic voltage supply through four input terminals, each input terminal connected to a plurality of SCR anodes, 146, 147, 148 and 149 respectively. When switch 134, (SW2) is closed simultaneously with the switch 132, (SW1) the second direct current voltage supply (6 VDC) provides a voltage through contacts 136, 136a, 156 or 156a and the contacts 90, 140, 142 or 158, depending on which set of contacts are in intimate contact. For discussion we will assume that when SW1 and SW2 are initially closed the contact 156 is in contact with the fixed contact 140 and that the contact 136 is not in contact with the fixed contact 142. The fixed contact 140 is connected to the SCR 116, gate 124. Therefore, the SCR 116 gate 124 senses an applied 6 VDC derived from the 6 VDC power supply connection through contact 140 and fixed contact 140. When the SCR 116, gate 124 senses the applied voltage the SCR 116 acts to conduct a positive current flow. The d.c. flows from the positive side of the 12 VDC power supply through the conductors 101 to the SCR 116 anode 146, through the SCR 116 cathode 160 and through the electrically conductive coils 24, (S2, S4, S6, and S8).

FIG. 4 illustrates the electrically conductive coils 24 connected in electrically parallel to each other. Each electrically conductive coil, e.g. S2, is understood to represent either the single stator configuration viz. alternate embodiment illustrated in FIG. 5, as item 184 or the row of stators configured in FIG. 2, as item 24.

Although, FIG. 4 shows the electrically conductive coils 24 connected in electrical parallel to each other, the same basic operation of the motor 10 is achieved if the electrically conductive coils 24, S2 through S8 and S1 through S7 are connected in electrical series (unshown).

When the electrically conductive coils 24, (S2, S4, S6 and S8) conduct current they each produce an electromagnetic flux due to solenoid action. It will be noted that the average current flowing through the electrically conductive coils is directly proportional to the time interval that SCR 116 conducts current. The time interval that SCR 116 conducts current is proportional to the time it takes for a 45 degree rotation of the rotor 12 shaft 70 and consequently the set of rotary electrical contacts 99 mounted thereon which ultimately produces periodic timing pulses.

The electromagnetic fluxes thus created are coupled to the spatially distributed, localized flux 50 about the outer circumference 52 of the rotor 12 (FIG. 6) to produce a working electromotive force on the rotor 12. The spatial distribution of the localized flux 50 is dimensionally sufficiently broad to encompass an area over the rotor 10 surface to include surface magnet groups of opposite magnetic poles. Where the electromagnetic flux and the localized flux 50 are of the same polarity i.e. the magnetic fields are in opposite but parallel directions, vectorially, a reaction force is created which impels the rotor 12 to rotate. Where the electromagnetic flux and the localized flux 50 are of the opposite polarity i.e. the magnetic fields are in the same but parallel directions, vectorially, an action force is created which impels the rotor 12 to rotate. Both the reaction forces and action forces cause the rotor 12 to rotate in the same direction.

During the time interval the SCR 116 conducts current a capacitor 152 (C1) charges to the value of the voltage that is present at the SCR 116 cathode 160. The SCR 116 will continue to conduct current as long as the potential voltage difference across SCR 116 anode 146 and its cathode 160 remains positive. When the rotor advances 45 degrees the plurality of radially disposed contacts 99 advance 45 degrees as well and the rotatable contact 156 advances 45 degrees until it is no longer in intimate contact with the fixed contact 140. When contact between the rotatable contact 156 and a fixed contact 140 is broken the 6 VDC is removed from the SCR 116 gate 124. This gate voltage is not necessary once the SCR 116 begins conduction. As the rotor advances, the rotatable contact 136a finally contacts the contact 158. This physical contact now produces the 6 VDC on the contact 158 to be impressed on the SCR 117 gate 125. The voltage at the SCR 117 gate 125 causes the SCR 117 to conduct current from its anode 147 to its cathode 161. The SCR 117 cathode 161 is connected to a resistor 164 (R1) and a capacitor 152 (C1). The resistor 164 (R1) provides a current discharge path from anode 154 to the ground side of the conductors 101 and the 12 VDC power supply.

The voltage across the capacitor 152 (C1) cannot change instantaneously when the SCR 117 conducts current. The charge through the capacitor does change instantaneously and when the SCR 117 conducts it causes a node 170 to drive sharply positive in voltage. The magnitude of the voltage at the node 170 is thereby equal to the sum of the existing potential voltage at the node 170 before the SCR 117 conducts current and the voltage created by the instantaneous charge at the node 170 when the SCR 117 conducts current. The sum voltage at the node 170 when the SCR 117 conducts current causes the SCR 116 cathode 160 to drive more positive than SCR 116 anode 146 thereby causing the SCR 116 to cease conduction. At this time current flow to the electrically conductive coils 24, (S2, S4, S6 and S8) ceases.

At the instant in time the rotor rotates 45 degrees so that the rotatable contact 136a contacts the fixed contact 158, the rotatable contact 156a contacts the fixed contact 142 causing the SCR 118 gate 126 to sense the 6 VDC potential. The SCR 118 conducts current from the voltage present at conductors 101 and through the SCR 118 anode 148 to the SCR 118 cathode 162 to the second set of electrically conductive coils 24, (S1, S3, S5 and S7).

The above mentioned operation of the switching module 102 is then identically repeated as described above during operation of a switching module 104. At the end of the switching module 104 operation another rotatable contact 136a contacts the fixed position contact 140 and causes the previously described operation of the switching module 102 to repeat. When rotatable contact 136a is in intimate contact with the fixed contact 140 the previous contact between any rotatable contact and the fixed contact 158 is broken and the SCR 117, gate 125 no longer has the 6 VDC potential applied. When the SCR 116 conducts current it causes the node 154 at the capacitor 152 (C1) to drive sharply positive in voltage. The voltage at the node 154 is now equal to the sum of the voltage present at the node 154 before the SCR 116 conducted current and the above mentioned voltage created at the node 154 when the SCR 116 conducted current.

The sum of the voltage at the node 154 when the SCR 116 conducted current causes SCR 117 cathode 161 to become more positive in voltage than the SCR 117 anode 147 thereby causing the SCR 117 to cease conduction. The resistor 164 (R1) then acts to discharge the capacitor 152 (C1) to ground potential preparing it for the next cycle.

A neutralizing capacitor 135 (C3) is connected between the SCR 116 cathode 160 and ground. Capacitor 135 (C3) has as its function to limit the charging rate of current flowing through the conductive coils 24.

Two diodes 137 (D1-D2) are included in the circuit to limit any negative voltage overshoot as the electrically conductive coils 24 are turned on and off. This effectively prevents the SCRS reverse voltage breakdown point to occur.

DESCRIPTION OF AN ALTERNATE EMBODIMENT

Figure 5A:
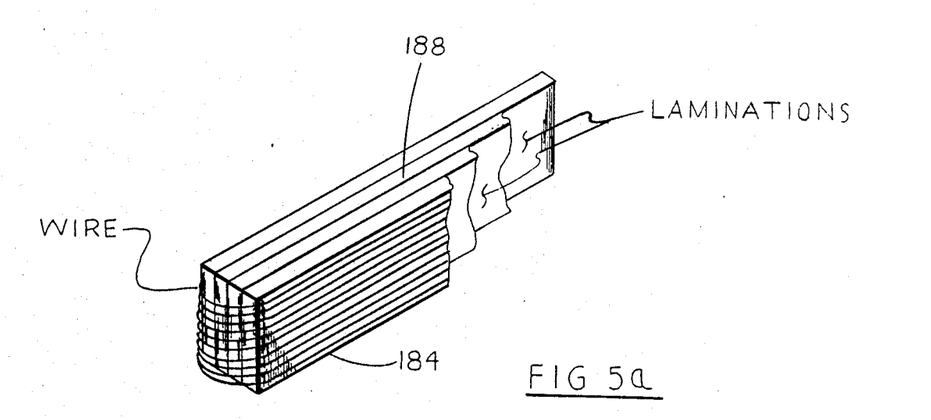
FIG. 5a represents an enlarged, partial view of the alternate embodiment, as taken from FIG. 5 to illustrate one construction of one of the electrically conductive coils.

Referring to FIGS. 5 and 5a, there is shown in isometric view of the pm d.c. motor apparatus 10 with a particular configuration, relating to the construction of the electrically conductive coils 24 of the preferred embodiment, previously defined in this specification. It will be seen in FIG. 5, that an electrically conductive coil 184 is elongated, along the longitudinal direction of the motor 10. As shown, the coil as such, has a copper wire 186 wound in the aforementioned direction, about a group of elongate non-ferromagnetic or ferromagnetic laminations 188 which are appropriately mechanically attached together, to provide the body of the acting solenoid (coil) for the purposes set forth and defined beforehand in the preceding text. It will be recognized that the construction of the coils 24 or of the coil 184, and the general arrangement sets forth an option for manufacturing consideration and ease of assembly which will depend upon individual requirements. The electrical operation of the alternate construction is the same as defined for the preferred embodiment, and therefore it is a matter of preference.

The operation of the motor as defined is intended to create a reliable feedback control system at such time that the rotor 12 is caused to move by the electromagnetic coupling produced by the sequential operation of the electrical control device 16. While the rotor is rotating, through the 45 degree angle, the torque and speed produced by the electromagnetic force is essentially being maintained at a substantially uniform level through the electrical control circuit 100.

Therefore, having described a preferred embodiment and alternate embodiment of a permanent magnet d.c. motor apparatus, it will be mentioned that the accompanying drawings and schematics may be altered to suit other versions with the same effect of the intended present invention. For these reasons, the accompanying claims are intended to capture the spirit and scope of the present invention.

What is claimed:

1. A permanent magnet d.c. motor apparatus comprising:
   A. rotor means having a homogeneous core surrounding a longitudinal axis upon which is mounted an outer, segmented ring formed of a plurality of alternating polarized groups of magnets, such that any first group of magnets of a polarized group and other polarized groups of magnets has an end magnet juxtaposed to an end magnet of a second group of magnets of said polarized groups of magnets for providing a plurality of spatially distributed, localized magnetic flux about the outer circumference of said outer segmented ring;
   B. stator means having a plurality of cylindrically spaced rows of electrically conductive coils which are radially disposed outside of said rotor means for electromagnetic coupling to said spatially distributed, localized magnetic flux about said rotor circumference of said outer segmented rings;
   C. timing means for providing a periodic timing pulse in response to rotation of said rotor, and;
   D. electronic control means responsive to said periodic timing pulse for providing a sequential flow of current to said conductive coils, whereupon said current is directly proportional to a generation of said periodic timing pulses during one revolution of said rotor;
   wherein said timing means is mounted for rotation with said rotor comprising;
   a circular disk with a plurality of radially disposed electrical contacts mounted thereon;
   a plurality of fixed contacts which contact said radially disposed electrical contacts as the disk rotates;
   a d.c. electrical potential connected to said radially disposed electrical contacts;
   a timing pulse conductor between said radially disposed electrical contacts and said electronic control means, said conductor providing an electrical path to communicate periodic timing pulses.

2. A permanent magnet d.c. motor apparatus as set forth in claim 1 wherein said rotor has ends for adapting to bearings mounted to said stator means.

3. A permanent d.c. motor apparatus as set forth in claim 1 wherein said homogeneous core is formed of a dielectric material.

4. A permanent magnet d.c. motor apparatus as set forth in claim 1 wherein said stator are axially oriented at a substantial right angle with respect to the longitudinal axis of said rotor.

5. A permanent magnet d.c. motor apparatus comprising;
   A. rotor means having a homogeneous core surrounding a longitudinal axis upon which is mounted an outer, segmented ring formed of a plurality of alternating polarized groups of magnets, such that any first group of magnets of a polarized group and other polarized groups of magnets has an end magnet juxtaposed to an end magnet of a second group of magnets of said polarized groups of magnets for providing a plurality of spatially distributed, localized magnetic flux about the outer circumference of said outer segmented ring;
   B. stator means having a plurality of cylindrically spaced rows of electrically conductive coils which are radially disposed outside of said rotor means for electromagnetic coupling to said spatially distributed, localized magnetic flux about said rotor circumference of said outer segmented rings;
   C. timing means for providing a periodic timing pulse in response to rotation of said rotor, and;
   D. electronic control means responsive to said periodic timing pulse for providing a sequential flow of current to said conductive coils, whereupon said current is directly proportional to a generation of said periodic timing pulses during one revolution of said rotor;
      wherein said electronic control means comprises;
      two switching module means for sequentially conducting direct current to said conductive coils in response to said periodic timing pulses;
      means for connecting said switching module means to a plurality of said conductive coils.

6. The electronic control means as set forth in claim 5, having two opposing end terminals, four input terminals, two output terminals, two switching modules for operative control of said permanent magnet stepping motor apparatus in response to said periodic timing pulses in proportion to a speed of said rotor wherein each said switching module comprises:
   A. first silicon control rectifier (SCR) having a cathode, anode and gate, said cathode connected to said first output terminal, said anode connected to said first opposing end terminal, and said gate connected to said first input terminal, for providing an interruptable sequential flow of d.c. to said first output terminal;
   B. a second silicon control rectifier having a cathode, anode and gate, said cathode connected to a transfer capacitor and a discharge resistor, said anode connected to said first opposing end terminal, and said gate connected to said second input terminal for providing a current to interrupt the sequential flow of d.c. through said first SCR;
   C. said transfer capacitor connected between said cathode of said first SCR and said cathode of said second SCR such that when current is conducted through said second SCR a charge generated on said transfer capacitor on said cathode side of said first SCR is sufficient to interrupt said d.c. current flowing from said anode to said cathode of said first SCR;
   D. a resistor connected between said cathode of said second SCR and said second opposing end terminal for providing a d.c. discharge path for said transfer capacitor;
   E. a neutralizing capacitor connected between said cathode of said first SCR and said second opposing end terminal to control the level of current flowing through said first and second conductive coils.

7. A permanent magnet d.c. motor apparatus comprising:
   A. rotor means having a homogeneous core surrounding a longitudinal axis upon which is mounted an outer, segmented ring formed of a plurality of alternating polarized groups of magnets, such that any first group of magnets of a polarized group and other polarized groups of magnets has an end magnet juxtaposed to an end magnet of a second group of magnets of said polarized groups of magnets for providing a plurality of spatially distributed, localized magnetic flux about the outer circumference of said outer segmented ring;
   B. stator means having a plurality of cylindrically spaced rows of electrically conductive coils which are radially disposed outside of said rotor means for electromagnetic coupling to said spatially distributed, localized magnetic flux about said rotor circumference of said outer segmented rings;
   C. timing means for providing a periodic timing pulse in response to rotation of said rotor, and;
   D. electronic control means responsive to said periodic timing pulse for providing a sequential flow of current to said conductive coils, whereupon said current is directly proportional to a generation of said periodic timing pulses during one revolution of said rotor; wherein said stator means is comprised of cylindrically spaced elongate conductive coils which are radially disposed outside of said rotor for electromagnetic coupling to said spatially distributed, localized magnetic flux about said rotor circumference of said outer segmented rings;
   wherein said stator means is comprised of cylindrically spaced elongate conductive coils which are radially disposed outside of said rotor for electromagnetic coupling to said spatially distributed, localized magnetic flux about said rotor circumference of said outer segmented rings.

* * * * *